(12) United States Patent
Grossjohann et al.

(10) Patent No.: US 6,939,222 B2
(45) Date of Patent: Sep. 6, 2005

(54) CROP DISCHARGE SPOUT ARRANGEMENT OF AN AGRICULTURAL HARVESTING MACHINE

(75) Inventors: Harald Grossjohann, Zweibrücken (DE); Laurent Bissen, Weicherdange (LU)

(73) Assignee: Deere & Company, Moline, IL (US)

( * ) Notice: Subject to any disclaimer, the term of this patent is extended or adjusted under 35 U.S.C. 154(b) by 242 days.

(21) Appl. No.: 10/388,942

(22) Filed: Mar. 14, 2003

(65) Prior Publication Data

US 2003/0217539 A1 Nov. 27, 2003

(30) Foreign Application Priority Data

Mar. 16, 2002 (DE) .......................... 102 11 706

(51) Int. Cl.⁷ .................. A01D 17/02; A01F 12/46
(52) U.S. Cl. ...................................... 460/114
(58) Field of Search ................ 460/114; 414/523, 414/335, 505; 109/536

(56) References Cited

U.S. PATENT DOCUMENTS

| 3,075,813 A | * | 1/1963 | Vohl ........................... 406/158 |
| 3,088,779 A | * | 5/1963 | Vachon ........................ 406/158 |
| 4,184,274 A | * | 1/1980 | Vohl ............................. 37/261 |
| 4,312,143 A | * | 1/1982 | Kado ............................ 37/261 |
| 5,953,892 A | | 9/1999 | Albicker et al. .............. 56/71 |
| 2001/0026755 A1 | | 10/2001 | Wood et al. .................. 414/523 |
| 2002/0121200 A1 | | 9/2002 | Viaud |

FOREIGN PATENT DOCUMENTS

| DE | 27 07 394 | 8/1978 |
| DE | 35 44 166 C | 3/1987 |
| DE | 86 06 709 U | 2/1988 |
| EP | 1 275 290 A | 7/2002 |

\* cited by examiner

Primary Examiner—Árpád Fábián Kovács

(57) ABSTRACT

A discharge spout arrangement of an agricultural harvesting machine through which harvested crop processed by the harvesting machine can be transported to a transport vehicle. The discharge spout arrangement includes a first spout element connected with the harvesting machine. A second spout element is mounted to and defines an extension the first spout element. The second spout element is slidably movable between fully retracted and extended positions respectively wherein a discharge end of the second spout element is spaced a minimum and a maximum distance from a discharge end of said first spout element.

3 Claims, 2 Drawing Sheets

CROP DISCHARGE SPOUT ARRANGEMENT OF AN AGRICULTURAL HARVESTING MACHINE

FIELD OF THE INVENTION

The invention concerns a discharge spout arrangement of an agricultural harvesting machine, through which harvested crop processed by the harvesting machine can be conducted to a transport vehicle.

BACKGROUND OF THE INVENTION

Forage harvesters are harvesting machines that take up harvested crop from the ground, chop it, and deposit it through a discharge spout arrangement upon a deposit surface of a transport vehicle operating alongside or towed by the forage harvester. In order to fill the transport vehicle in a controlled manner, the direction of ejection can be varied by a discharge spout arrangement rotating about a vertical axis. In some embodiments, the height of the outlet end of the discharge spout arrangement can also be varied in that the discharge spout arrangement can be pivoted about a horizontal axis. Furthermore, an adjustable flap is provided at the outlet end of the discharge spout arrangement in order to provide an input for the direction of ejection. Such a forage harvester is disclosed, for example, by DE 101 19 279 A.

With relatively wide front harvesting attachments, (corn heads with operating width of 8 or 10 rows), or upon the operation of a chopper on an incline, it happens occasionally that the optimal spacing to the transport vehicle operating alongside cannot be maintained. Frequently, the distance between the forage harvester and the transport vehicle is too large, so that the transport vehicle is filled only on one side. This can lead to a loss of time in the chain of events in the operation of the chopper if the transport vehicle must be changed too early, since it cannot be loaded any further. In addition, in case of strong side winds during the deposit of the harvested crop onto the transport vehicle, losses can result if the flap of the discharge spout arrangement is at too great a distance from the trailer.

Rigid extension elements are known that can be attached to one side of the discharge spout arrangement for the solution of these problems. They do, however, have the disadvantage that they can have the effect of an interference in many other operating conditions in which the transport vehicle is already operating close to the forage harvester.

US 2001/0026755 A proposes a grain wagon with a discharge screw conveyor at whose outer end an extension is provided that can be telescoped by means of a hydraulic cylinder. The extension is automatically extended when the discharge screw conveyor is brought into its operating position. The telescoping extension is thereby used only for the more compact storage of the discharge screw conveyor in its non-operating position.

The problem underlying the invention is seen in the need to define an improved discharge spout arrangement in which the disadvantages noted above do not occur.

SUMMARY OF THE INVENTION

According to the present invention, there is provided a discharge spout arrangement for a crop harvester that may be selectively extended and retracted.

It is proposed that the discharge spout arrangement be composed of two spout elements. A first spout element is connected with the harvesting machine. A second spout element that contains the outlet end of the discharge spout arrangement, is mounted to, and can be telescoped in axial direction relative to, the first spout element during the harvesting operation.

In this way, the length of the discharge spout arrangement becomes variable. When the transport vehicles operate alongside each other, they operate as trailers or as other silo vehicles, and the outlet end of the discharge spout arrangement can always be positioned optimally over the filling surface. Thereby the load capacity of the vehicles is utilized optimally. Waiting times can be avoided, and the chain of events in the operation of the chopper, proceeds more cost-effectively. The operator of the harvesting machine and the operator of the transport vehicle are relieved of some of their duties, since a predetermined fixed spacing between the silo vehicle and the front harvesting attachment need not be maintained with absolute precision. Since the spacing between the harvesting machine and the transport vehicle can be varied and can be selected sufficiently large, the danger of a collision between the transport vehicle, and in particular, a relatively wide front harvesting attachment, is reduced. In the chain of vehicles in the operation of a chopper, the most varied transport vehicles are frequently used and each tractor operator has his own preferred spacing safety margin from the forage harvester. The adjustable second spout element can accommodate these different spacings. During operation on a slope and in wet weather, the transport vehicles frequently slide easily down the slope. This change in spacing to the harvesting machine can also be accommodated by the adjustable discharge spout arrangement. During the operation of a chopper with transport trailers towed by a harvesting machine, wind losses can be avoided in that the outlet end of the discharge spout arrangement is conducted more closely to the transport vehicle. Here too, a better accommodation to transport vehicles of varied configurations is possible.

Basically the invention can be applied to any desired harvesting machine discharge spout arrangement, for example, forage harvesters or combines. It is particularly useful when applied to forage harvesters, since a transport vehicle is being filled during the entire harvesting process. Furthermore, the discharge spout arrangement can be extended in a relatively simple way, since no conveyor is provided in the discharge spout arrangement as is located, for example, in the unloading pipe of a combine.

Preferably, an actuator, that is actuated by external power, is provided by means of which the second element can be slid relative to the first element. This may be an electric motor or a hydraulic cylinder or motor. A manual shifting of the second element would also be conceivable that is applied directly when the harvesting machine is stopped in place to the discharge spout arrangement or from the operator's station by an appropriate mechanism. Here, elements can be provided to arrest the second element in a desired position.

If an actuator, actuated by external power, is used, there is the possibility of controlling it by appropriate input arrangements from the operating position of the operator by manual inputs. The input arrangements may include switches in a multi-function handgrip, switches in the operator's console or a foot-operated switch on the floor of the operator's cab. On the other hand, sensors can also be applied that detect the position of a transport vehicle and control the actuator automatically in such a way that the harvested crop is deposited at the desired location. The sensors may detect the transport vehicle optically and control the actuator by means of an image processing software.

An optical or an acoustic distance measuring device could also be applied. In another embodiment, the harvesting machine and the transport vehicle are each equipped with a position sensor, for example, a GPS receiver whose position signals are used for the automatic control of the actuator.

The second spout element is supported in bearings so as to slide relative to the first spout element. In order to be able to slide with a minimum of wear, one solution is to arrange a bearing element between the two elements, which preferably consists of plastic. Here, the material is particularly in the form of rails of ultra high molecular weight polyethylene (UHMW-PE) which is distinguished by excellent wear resistance and very good friction characteristics. However, rolling contact bearings could also be applied between the first and the second elements.

Particularly, when the second element of the discharge spout arrangement is in its extended position, large forces must be absorbed that result from the operating movement of the harvesting machine and the harvested crop deflected by the second element. These forces are absorbed preferably by arms and rolls that transmit the forces from the second spout element to the first spout element. Such arms may be arranged on opposite sides of the second spout element so as to extend along opposite sides of, and engage opposite side surfaces of, the first spout element. The axes of rotation of the rolls are appropriately oriented transverse to the axis of sliding of the second spout element, so that the rolls can roll along the surface or surfaces of the first spout element.

BRIEF DESCRIPTION OF THE DRAWINGS

The drawings show an embodiment of the invention that shall be described in greater detail in the following.

DESCRIPTION OF THE PREFERRED EMBODIMENT

Figure 1:
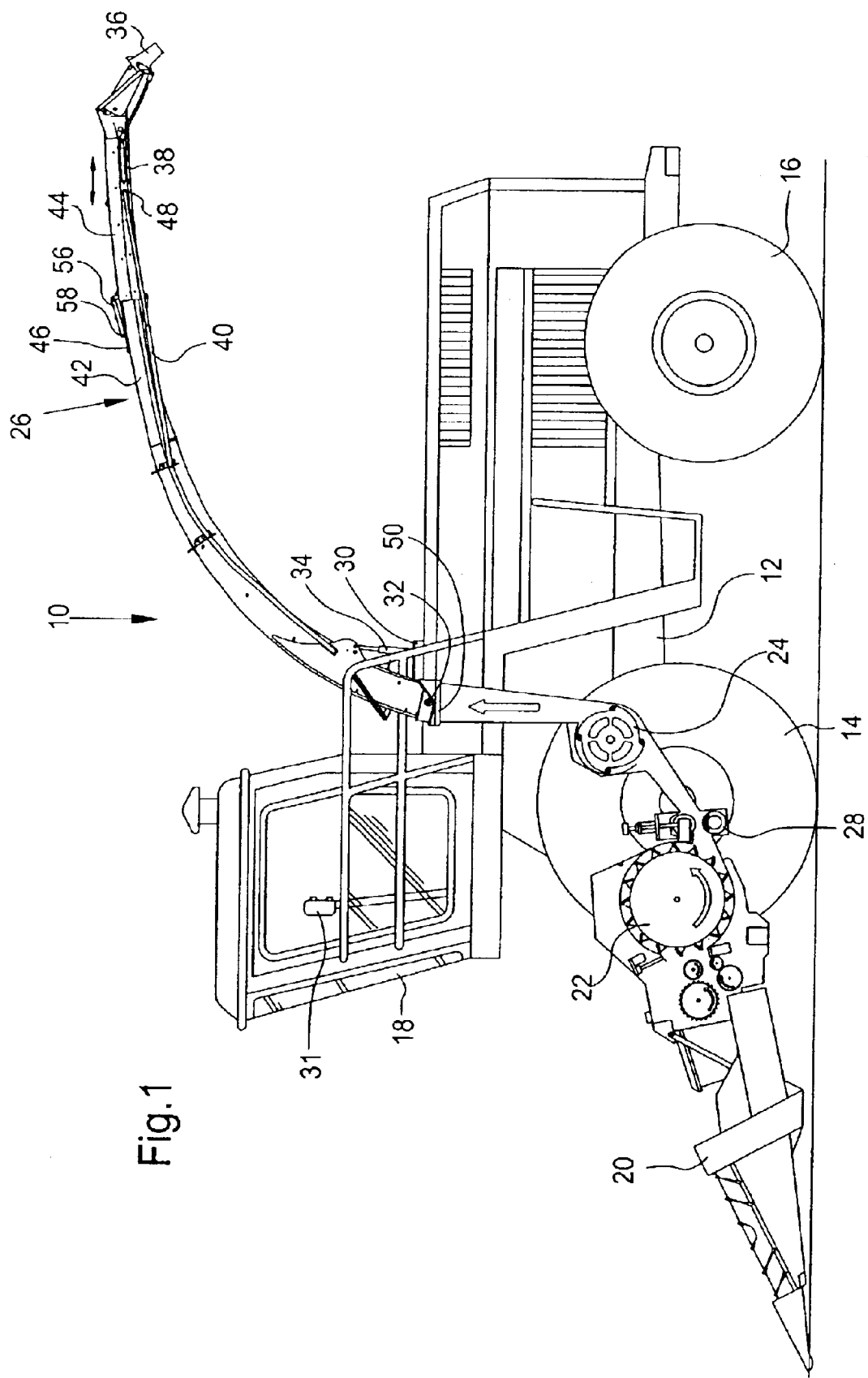
FIG. 1 is a somewhat schematic, left side view of a harvesting machine.

A harvesting machine 10 in the form of a self-propelled forage harvester is built on a frame 12 that is carried by front and rear pairs of transversely spaced wheels 14 and 16, respectively. The harvesting machine 10 is controlled from an operator's cab 18 from which a harvested crop take-up arrangement 20 can be viewed. Crop, such as corn, grass or the like, taken up from the ground by means of the harvested crop take-up arrangement 20, is conducted to a chopper drum 22 which chops it into small pieces and delivers it to a conveyor or blower arrangement 24. The crop leaves the harvesting machine 10 to a transport vehicle operating alongside through a discharge spout or duct arrangement 26 mounted to the harvesting machine for swinging about a vertical axis. Between the chopper drum 22 and the conveyor arrangement 24, there extends a post-chopper reduction or kernel processor arrangement 28 through which the crop to be conveyed is conducted tangentially to the conveyor arrangement 24.

The positions of the components of the discharge spout arrangement 26 can be varied by means of actuators 30, 34, 38, and 40. A first actuator 30, in the form of a hydraulic motor, is used to rotate the discharge spout arrangement 26, supported in bearings on the frame 12 on a slewing rim 50, about the vertical axis. The actuator 30 makes it possible to rotate the discharge spout arrangement 26 to the rear into the transport position shown in FIG. 1 or to bring it to the left or the right alongside the harvesting machine 10. A second actuator 34, in the form of a hydraulic cylinder, is arranged to pivot the discharge spout arrangement 26 about a horizontal axis 32 located at its upstream or inner end. Thereby, the second actuator 34 defines the height of the downstream end of the discharge spout arrangement 26. A third actuator 38, in the form of a hydraulic cylinder, is used to pivot an ejection flap 36 at the outlet end of a second spout element 44 of the discharge spout arrangement 26. The ejection flap 36, that can be repositioned, makes it possible to adjust the angle at which the harvested crop leaves the discharge spout arrangement 26. The actuators 34 and 38 are single-acting or double-acting hydraulic cylinders, where, in the case of single-acting hydraulic cylinders, the return movement is performed by the force of gravity on the weight of the discharge spout arrangement 26 or the ejection flap 36. In the embodiment shown, the actuator 34 is single-acting and the actuator 38 is double-acting. The actuator 30 can selectively rotate the discharge spout arrangement 26 either in the clockwise direction or in the counterclockwise direction about the vertical axis of the slewing rim 50. The actuator 40 is a double-acting hydraulic cylinder. The actuators 30, 34, 38, and 40 can be remotely controlled by means of an input arrangement 31 attached to an operating control lever, that is located in the operator's cab 18.

The discharge spout arrangement 26 is composed of a first spout element 42 and the second spout element 44. The first spout element 42 has an inlet or first end mounted to the frame 12 at the horizontal slewing rim 50 such that the first spout element 42, and hence the spout arrangement 26, is rotatable about the vertical axis of the slewing rim 50. The second spout element 44 is mounted for sliding upon the first spout element 42 at a downstream section containing a second or discharge end of the first spout element 42. The second spout element 44 telescopically receives, and is mounted for sliding in the axial direction relative to, the first spout element 42. The actuator 40 is selectively extendable and retractable in order to be able to vary the distance between the outlet or discharge end of the second spout element 44 and the vertical axis of rotation of the discharge spout arrangement 26 during the operation of the harvesting machine 10, as is indicated by the double-headed arrow in FIG. 1. The cylinder of the actuator 40 is connected with the first spout element 42 and its piston rod is connected over a connecting pin or element 48 with the second spout element 44. Bearing elements 46, in the form of elongate, flat rails or strips, constructed of ultra-high molecular weight polyurethane (UHMW-PE), are fixed to a top surface of the first spout element 42 in a region immediately preceding the discharge end of the first spout element and are received within a region of the second spout element 44.

Figure 2:
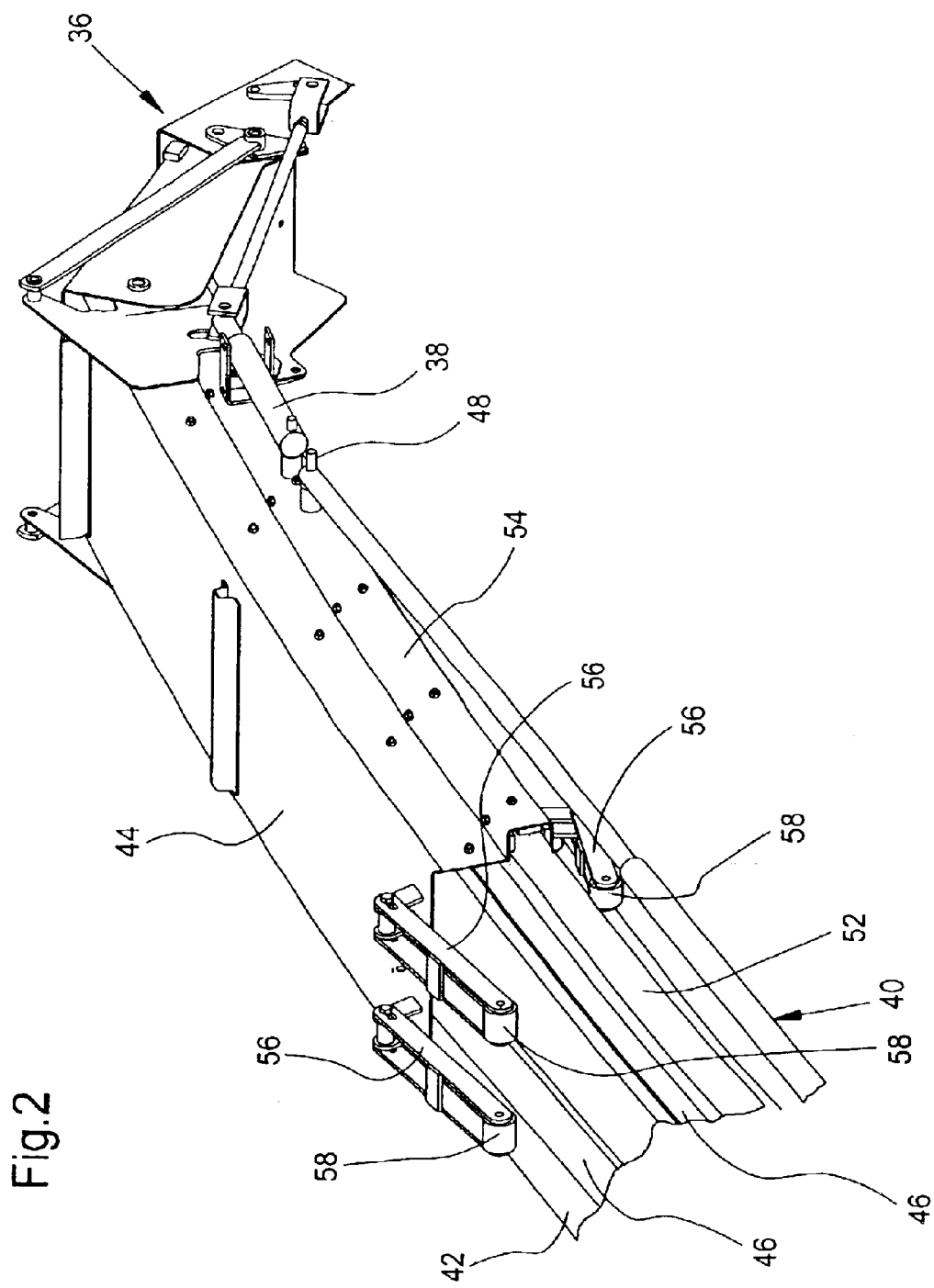
FIG. 2 is a perspective view of the end region of the discharge spout arrangement.

The perspective view of the discharge spout arrangement 26, rendered in FIG. 2, permits a better view of the structure attaching the second spout element 44 to the first spout element 42. The first spout element 42 is provided on its side wall with an outwardly or transversely projecting channel element 52 having a rectangular cross section. In the interior of the channel element 52, a channel is located through which an electrical wire or cable (not shown) is routed that leads to a lamp, also not shown, arranged at the outer end of the second spout element 44. Above the channel element 52, another relatively thin, elongate bearing element 46, made of UHMW-PE, is provided and is connected with the first spout element 42, in particular, by means of adhesive. The bearing element 46 can also extend around the channel element 52 or it may include three separate strips that are respectively arranged along the under, outer, and top sides of the channel element 52. On the basis of FIG. 2, it cannot be discerned that an identical channel element 52 and an identical bearing element 46 are also arranged on the other side of the first spout element 42. The bearing elements 46 extend up to the outer end of the first spout element 42.

The second spout element 44 is provided with an inner cross section that is slightly larger than the outer cross section of the first spout element 42. Each of opposite side walls of the second spout element 44 is provided with a rectangular channel 54 that encloses the adjacent channel element 52 of the first spout element 42. At its end that is slid upon the first spout element 42, the second spout element 44 is provided with four support bearings, each of which includes an arm 56 rigidly connected with the second spout element 44, and a roll 58 arranged at the outer end of the arm 56 which can rotate about its axis. Two arms 56 with rolls 58 are arranged alongside each other on the upper side of the first spout element 42 and are respectively located to engage the first spout element 42 at locations on opposite sides of the bearing element 46, but the use of a wider bearing element 46 would be conceivable upon which the rolls 58 can roll along. The arms 56 of the other two support bearings are respectively attached to the undersides of the pair of channels 54 at the opposite sides of the second spout element 44, and their rolls 58 are respectively in contact with the undersides of the channel elements 52 at the opposite sides of the first spout element 42. The rolls 58 are attached to the arms 56 so as to be free to rotate about their longitudinal axes that are oriented transverse to the direction of sliding of the second spout element 44. Although the arms 56 are rigidly attached to the second spout element 44, it would be conceivable to connect them in joints, free to pivot on it, and to preload them with the force of a spring against the first spout element 42.

The first spout element 42 and the second spout element 44 are in the form of channels that open downward, since the chopped harvested crop slides along the upper side of each of the elements 42, 44 of the discharge spout arrangement 26 due to the inertia imparted to the crop by the conveyor arrangement 24. However, embodiments partially closed downward would also be conceivable.

Having described the preferred embodiment, it will become apparent that various modifications can be made without departing from the scope of the invention as defined in the accompanying claims.

What is claimed is:

1. In an agricultural harvesting machine including a discharge spout arrangement through which harvested crop processed by the harvesting machine can be transported to a transport vehicle, the improvement comprising: said discharge spout arrangement including first and second separate spout elements each having first and second ends; said first end of said first spout element end being connected with the harvesting machine; said second spout element being provided with at least one arm extending beyond said first end of said second spout element toward said first spout element; a roll being mounted to said arm and engaged with said first spout element; said second spout element being mounted to said first spout element for sliding along said first spout element and forming an extension of said first spout element which is movable between a fully retracted position, wherein said second end of said second spout element is spaced a minimum distance from said second end of said first spout element and a fully extended position, wherein said second end of said second spout element is spaced a maximum distance from said second end of said first spout element; and said roll rolling along said first spout element during movement of said second spout element relative to said first spout element.

2. The agricultural harvesting machine, as defined in claim 1, wherein said first spout element includes at least one plastic bearing element extending along a length dimension of said first spout element; and said second spout element being mounted for sliding along said at least one plastic bearing element.

3. The agricultural harvester, as defined in claim 1, wherein said at least one arm is mounted to one side of said second spout element; a second arm extending parallel to said at least one arm and being mounted to an opposite side of said second spout element from said one side; and a second roll being mounted to said second arm and engaging said first spout element.

* * * * *